United States Patent [19]

Hickman

[11] 4,066,291
[45] Jan. 3, 1978

[54] WEATHERIZED SYSTEM FOR MOTORCYCLE

[76] Inventor: John S. Hickman, 4149 N. Stowell Ave., Milwaukee, Wis. 53211

[21] Appl. No.: 679,184

[22] Filed: Apr. 22, 1976

Related U.S. Application Data

[63] Continuation-in-part of Ser. No. 548,357, Feb. 10, 1975, abandoned.

[51] Int. Cl.² .............................................. B62J 17/00
[52] U.S. Cl. ...................................... 296/78.1; 135/7; 280/289 R; 296/91
[58] Field of Search ................ 296/78.1, 79, 80, 78 R, 296/102, 91; 135/1 R, 1 A, 7; 98/1; 280/289

[56] References Cited

U.S. PATENT DOCUMENTS

| 2,396,493 | 3/1946 | Comiskey | 296/78.1 |
| 3,787,088 | 1/1974 | Dreyer | 296/78.1 |

FOREIGN PATENT DOCUMENTS

| 457,357 | 5/1950 | Italy | 296/78.1 |

Primary Examiner—Joseph F. Peters, Jr.
Assistant Examiner—John A. Carroll
Attorney, Agent, or Firm—Merriam, Marshall & Bicknell

[57] ABSTRACT

An enclosure for protecting occupants on a motorcycle is provided and includes a windscreen and a fairing having contoured sides fitted about the front wheel fork and having a seal member extending from the fairing to the fork to provide a waterproof seal therebetween. An electrically powered wiper and washer are provided to keep the windscreen clear. The fairing may include an air inlet with appropriate ducts and vents to permit the rider to control air circulation into the semi-enclosed compartment and to deflect water droplets away from the rear face of the windscreen. A rain and sun shield is removably located atop the windscreen and extends generally horizontally rearward therefrom. The shield is longitudinally divided by a flexible hinge to provide for ease of storage. The shield has a hooked mounting edge for insertion onto the windscreen. Elastic hold-down cords attach to the shield and combine with the mounting edge to permit the sun and rain shield to be deflected upwardly when bumped, for example, by the rider and to return to the normal operative position thereafter. During inclement weather, the windscreen is quickly raised to above eye level, permitting the rider to look through a washed and wiped windscreen and attach the rain and sun shield. During fair weather the windscreen can be swiftly lowered to allow the rider to look over the windscreen, thereby eliminating reflected glare in the crucial field of vision and retaining the preferred conventional motorcycling feel.

26 Claims, 14 Drawing Figures

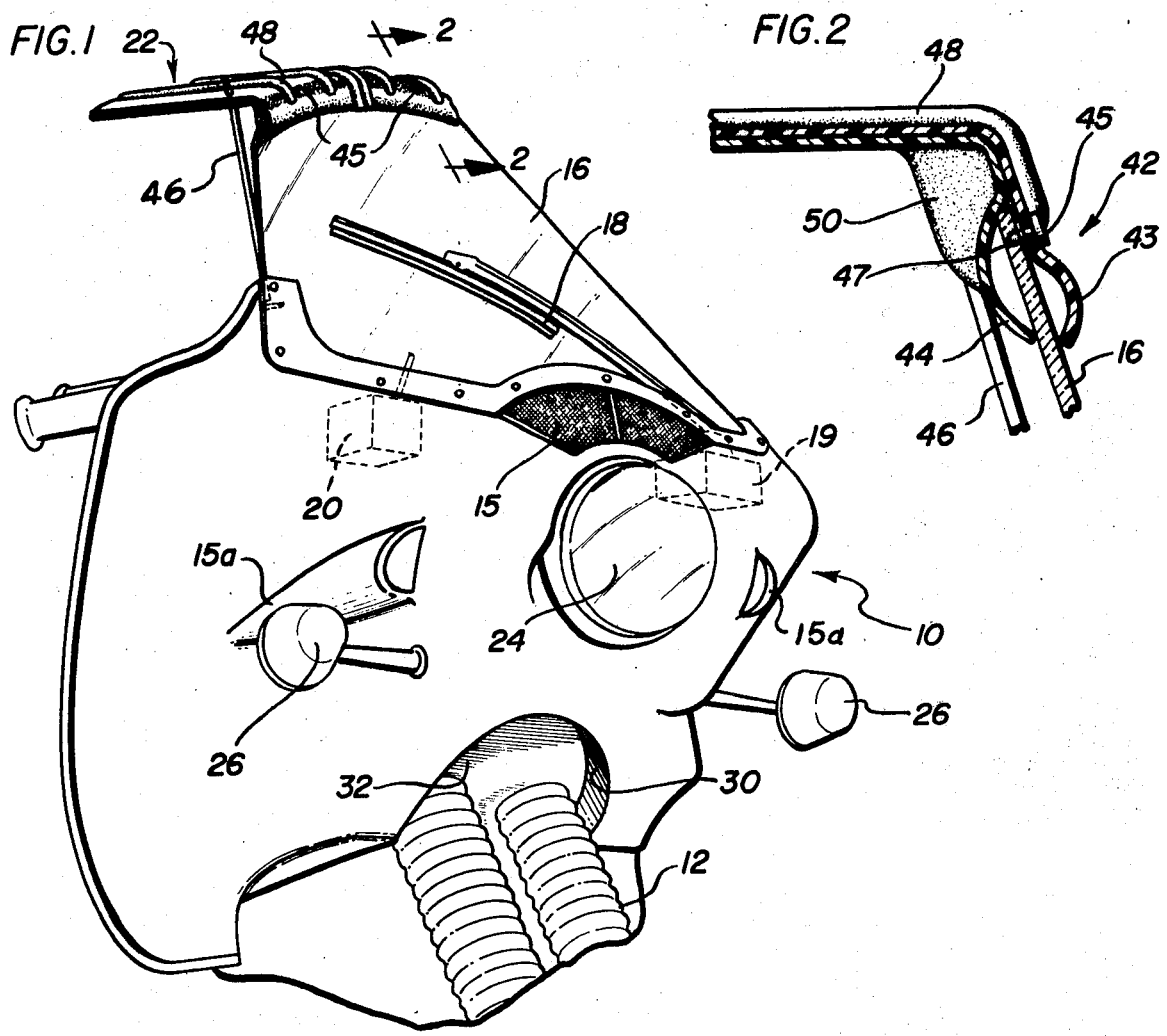
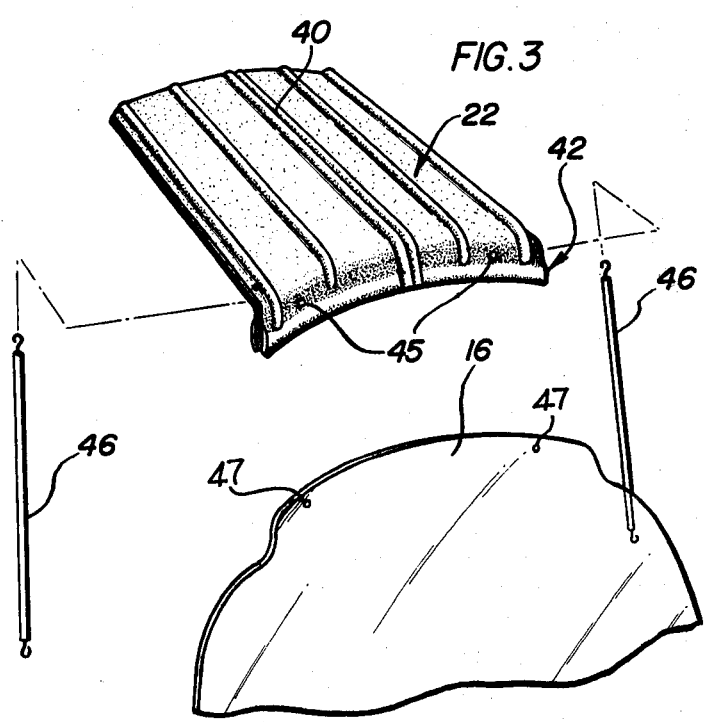

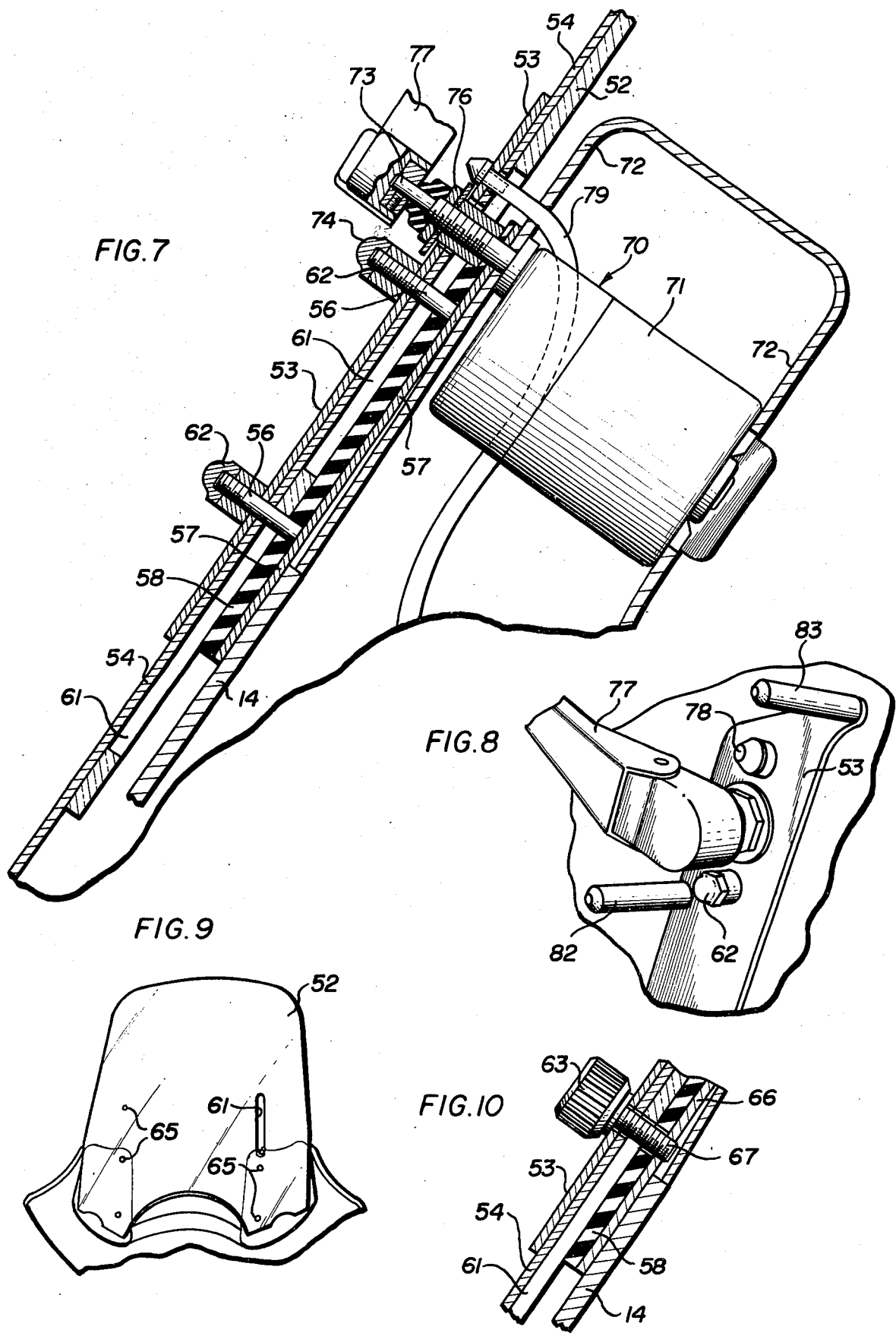

WEATHERIZED SYSTEM FOR MOTORCYCLE

This application is a continuation-in-part of my application filed Feb. 10, 1975, bearing Ser. No. 548,357, and now abandoned, entitled WEATHERIZED SYSTEM FOR MOTORCYCLE.

BACKGROUND OF THE INVENTION

This invention pertains to a protective enclosure for a motorcycle and more particularly to a weatherized system located on the forward portion of the motorcycle in front of a rider for protection against such elements as wind, rain and sun, during operation of the motorcycle. The enclosure includes a removable adjustable compact rainshield adapted to be positioned on a vertically adjustable windscreen.

While efforts have been made in the past to provide enclosures to protect a motorcycle rider from the elements, they have suffered from a number of deficiencies. In some instances, e.g., U.S. Pat. No. 1,608,512, the enclosures surrounding the rider are too bulky and massive and have not been found satisfactory. In other cases, such as illustrated in French Pat. No. 1,255,486, the roof member is not adjustable and thus fails to afford adequate protection against the elements, and/or presents a risk of injury to the rider under certain circumstances.

For example, the roof member in the device shown in the cited French patent is restrained against upward movement by a rear supporting post. When the post is disconnected, the roof member swings downwardly and forwardly for storage. The fixed joint between the windscreen and roof, however, prevents rotation of the roof upwardly and fowardly, so that the rider can be injured on going over a sharp bump which projects him into the roof.

It is desirable to provide a system for weatherizing the cycle to protect the rider from the elements during inclement weather. When the weather is not inclement, however, it is desired that the system be adapted to permit the rider to adjust it to his dictates.

Specifically, what is desired is a rain and sun shield which is adapted for easy assembly to the top of the windscreen. The shield should be fastened in such a manner that it can pivot about the windshield in the event a rider's head contacts the shield as a result of going over a severe bump or the like. Similarly, to provide for the safety for the motorcycle operator and preclude the danger of head or neck injuries, the shield should employ a means for attaching the shield that permits the shield to separate from the windscreen once the shield has moved or is pivoted beyond its maximum extent.

It is also desirable to have a shield which is adapted to be removably and readily fastened and laterally adjusted in position at the top of the windscreen. When not in use and removed from the windshield, it should be compact to permit it to be stored in a storage compartment of the motorcycle.

It is further desired that a weatherizing system provide a windscreen which is adjustably positioned relative to the fairing of the cycle. The windshield or screen should preferably have means for wiping off moisture that accumulates on the front of the screen, as well as means for removing any moisture that accumulates on the back of the windscreen.

SUMMARY OF THE INVENTION

The invention disclosed and claimed herein is directed to a weatherizing system for a motorcycle, which serves to protect a rider from the elements in inclement weather and can also be readily adjusted for use in weather which presents no problems for the vehicle rider. The system provides means for adjusting or removing various parts of the weatherizing system to accommodate different weather conditions as desired by the rider.

The invention includes a fairing, various embodiments of which are readily commercially available. A fairing of the type useful in the invention is a generally convex shell, open to the rear, which is attached in any conventional manner to the forward portion of the motorcycle frame. The fairing serves as a protective shield for the rider by intercepting water, snow, dust, gravel and the like in the path of the cycle and preventing contact with the body of a rider, primarily in the upper body and head areas.

The invention further includes a removable and laterally adjustable generally horizontal rain-sun shield positioned on a transparent windscreen attached to the front of the fairing.

The fairings heretofore known and used are conventionally provided with a windscreen which extends upwardly from the top edge of the fairing and which further protects the rider from the effects of wind, rain and the like. Because the screen, although transparent, can partially obstruct or interfere with the vision of the rider, particularly when obscured by rain or dust accumulated thereon, it is common to size the windscreen such that its upper edge falls below the eye-level of the rider, thus permitting him to look over the top thereof rather than through it when riding the cycle. With a relatively short windscreen of this type, however, it is difficult to attach thereto any type of shield for affording protection to the driver from the sun, rain and snow which come from above and are not intercepted by the fairing or windscreen.

In accordance with one embodiment of the invention, the effective height of the windscreen is adjustable between an upper position which affords adequate clearance for the rider when the wind-sun screen is attached thereto, and a lower position which, with the rain-sun shield removed, permits the rider to look over the windscreen in conventional fashion.

The rain-sun shield includes a hook-on receiving edge adapted to easily fit over the top of a windscreen. The connection of the shield to the windscreen permits the shield a limited amount of upward movement, so that the shield will give and pivot upwardly about the screen when struck by the rider, as, for example, when the vehicle is driven over a bump and the rider is lifted off the seat. A pair of resilient or elastic hold-down cords also connect the shield to the motorcycle and combine with the receiving edge to permit the shield to easily deflect upwardly and then return to its normal horizontal position, thus preventing injury to the rider and eliminating fracture of the windscreen and/or rain-sun shield which could occur with rigidly mounted members. The clip-on edge permits the shield to be detached or disengaged from the screen if the limited amount of upward movement is exceeded. The shield also preferably includes a large hinge dividing it into halves for folding and ease of storage.

An electric windscreen wiper and washer are provided for removing moisture and the like from the front face of the windshield for use of the motorcycle on wet surfaces during and after rainfall or other moisture accumulation. The control switches for the washer and wiper are located for convenient operation by the rider's left hand. Additionally, a wiper means is provided for wiping the rear face of the windscreen on those occasions when moisture or other material accumulates on the rear face of the screen.

These and other features and advantages of the invention will become apparent to those having ordinary skill in the art with reference to the drawings, description and appended claims.

DESCRIPTION OF THE DRAWINGS

FIG. 1 is a pictorial illustration of the front portion of a motorcycle showing the enclosure disclosed herein;

FIG. 2 is a partial sectional view of the rain-sun shield taken generally alone lines 2—2 of FIG. 1;

FIG. 3 is an exploded assembly view of the rain-sun shield and hold-down members in combination with the top of an associated windscreen;

FIG. 7 is a partial section view of the adjustable windscreen and wiper taken along lines 7—7 in FIG. 5;

FIG. 8 is a partial perspective view of the front windscreen wiper with a stop means for limiting the travel of the wiper;

FIG. 9 is a front view of another embodiment of the adjustable windscreen of the present invention;

FIG. 10 is a partial section view of the windshield of FIG. 9 and a fastening means for use in positioning the windscreen in the desired position;

DETAILED DESCRIPTION

Figure 4:
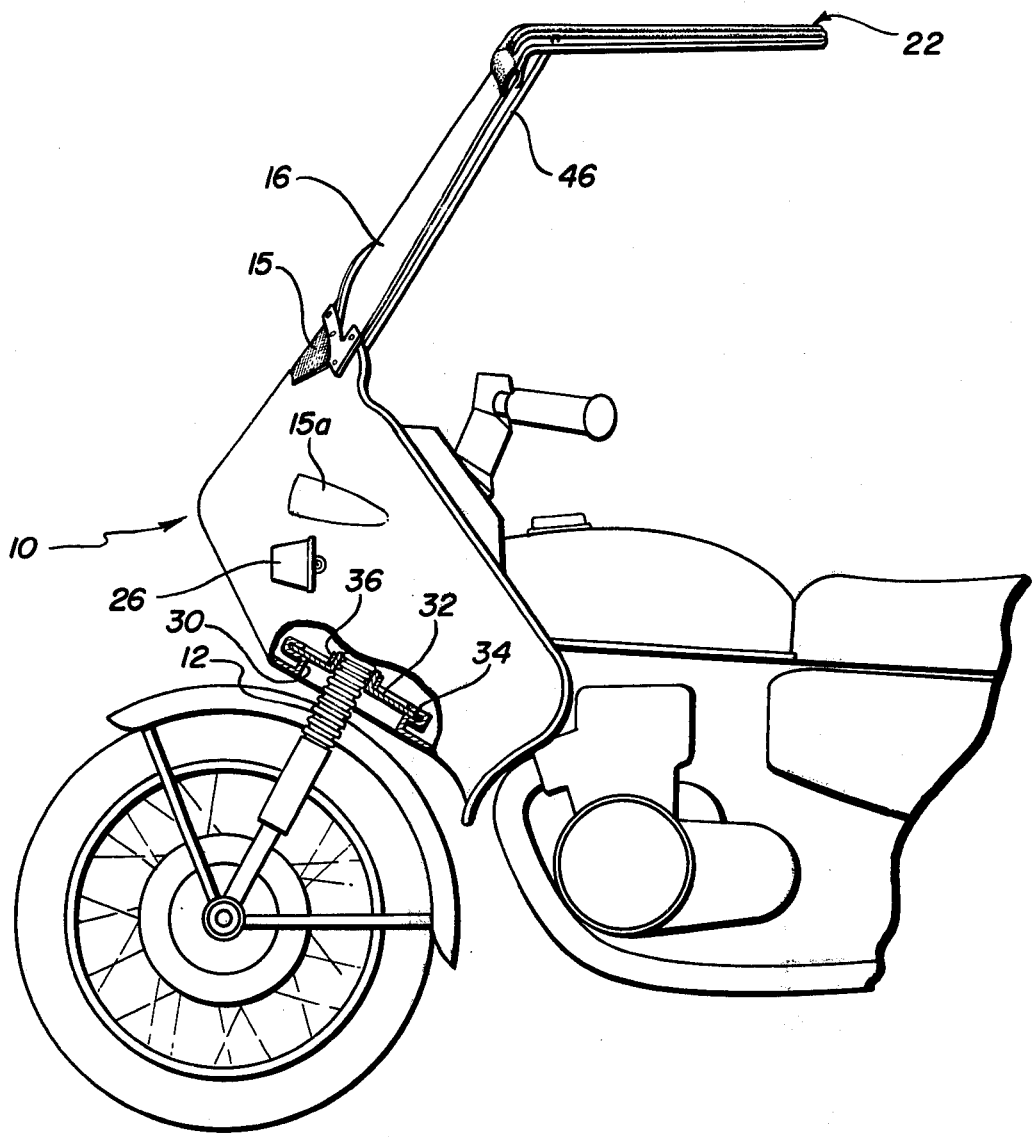
FIG. 4 is a side elevational view of portions of the motorcycle and front enclosure.
Figure 5:
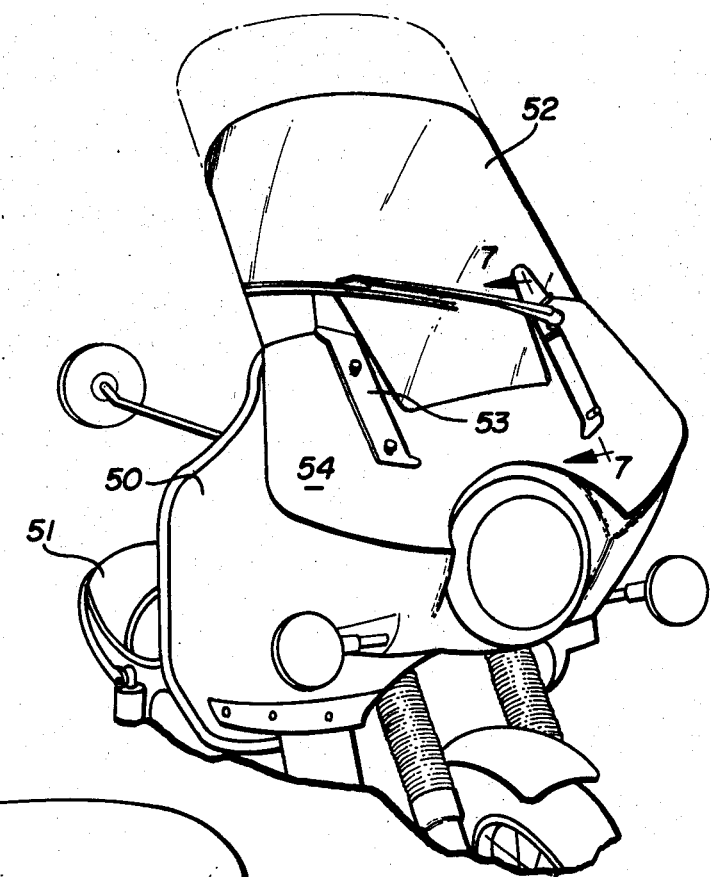
FIG. 5 is a partial perspective view of a motorcycle with a fairing having an adjustable windscreen attached thereto.

Referring to the drawings, there is shown in FIG. 1 one embodiment of the weatherized system of the present invention, comprising enclosure 10 mounted to the front portion of a motorcycle frame. Enclosure 10 includes windscreen 16 and a molded, generally convex fairing 14 having sides and a bottom which taper outwardly and rearwardly thereof in such a manner as to direct wind and the like around the motorcycle and its occupants. Fairing 14 is a conventional, commercially available product which can be obtained, for example, from Vetter Fairing Co., Rantoul, Illinois, 61867 and is described in a Vetter brochure dated October 1973. The fairing is attached to the motorcycle in any appropriate manner, the attaching means forming no part of the present invention.

Motorcycle front fork 12 shown in FIG. 4, extends through opening 30 in a lower part of the fairing 14. Either or both of fairing 14 or windscreen 16 attached thereto can be modified to include one or more air inlets 15, the total inlet area of which is preferably at least ten square inches. Fairing 14 can contain manually operable diffusers (not shown) for controlling the amount and direction of air flowing upwardly along the rearward face of the windscreen to deflect swirling water droplets away from it, or, during sunny weather, onto the rider. Air inlet scoops 15a can be formed in the fairing for increased air flow onto the rider and along the rear face of windscreen.

Attached by any appropriate means such as bolts or rivets to fairing 14 is a windshield or windscreen 16. Windscreen 16, which is optically clear or transparent, extends upwardly from the fairing 14 and functions to direct wind and airborne material away from the upper body of the motorcycle driver. A wiper assembly 18 positioned for clearing windscreen 16 is driven by electric motor 19 powered by the electrical system of the motorcycle. A washer unit 20 having a conventional fluid holding tank, spray assembly and squirting nozzle (not shown) is suitably located to permit a fluid to be applied to the windscreen 16 for cleaning purposes. Controls for both the wiper 18 and the wash unit 20 are located for convenient operation by the rider's left hand.

The front enclosure 10 may also include a headlamp 24 and a pair of directional turn signals 26 as shown in FIG. 1.

Front enclosure 10 is rigidly attached to the motorcycle frame by conventional means (not shown), so that opening 30 in fairing 14 must be provided to allow front fork 12 to move during operation of the cycle. To prevent the entry of rain, wind and the like, through opening 30, a seal 32 connects fairing 14 with fork 12. Seal 32 can be made of a flexible material such as a rubber sheet or the like, or a non-flexible material such as a plastic or metal plate. The seal 32 suitably includes a portion held in place by a band type of clamp 36 to complete the seal between the fairing 14 and the front fork 12. As shown in FIG. 4, a non-flexible seal 32 is securely attached to the fork 12 in a plane perpendicular thereto and has edge portions fitted into annular groove 34. When the fork turns, the seal 32 rotates in groove 34, yet provides a seal which is effective to prevent moisture, air and the like from entering the rider's area.

A rain-sun shield 22 is mounted atop the windscreen 16 and extends rearwardly to provide a protective cover for directing air and rain away from the driver, as well as providing protection against the sun. The rain-sun shield 22 can be generally horizontal or upwardly extending at a small angle up to about 35°. This angle further increases the ability of the shield 22 to deflect upwardly when struck by the rider and provides additional clearance above the rider when used with shorter windscreens. The rain-sun shield 22 is preferably constructed from an opaque or tinted material to cast a shadow and prevent objectionable sunlight from obscuring the driver's view or causing sunburn.

Rain-sun shield 22 includes a first portion 48 and snap-on type of mounting portion 42 shown in FIG. 2, including two spaced lip portions or legs 43, 44 spaced to receive the upper portion of the windscreen 16. As the shield 22 is attached to the windscreen 16, the lips 43, 44 will deflect, moving apart slightly and loosely grasping the enclosed portion of the windscreen 16. Mounting edge 42 permits rain-sun shield 22 to be moved laterally along the top of sunscreen 16 to a position affording the maximum protection to the driver. As an optional feature for high speed riding, there can be provided a safety hold-down pin 45 attached to sheet 43. The hold-down pin 45 enters a suitably placed hold-down pin hole 47 in windscreen 16 and prevents displacement of the rain-sun shield.

Figure 14:
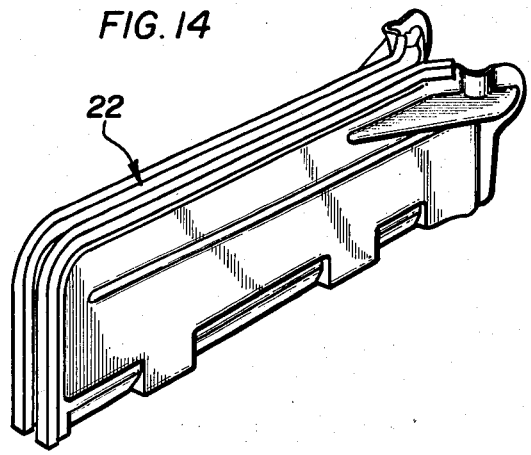

Since rain-sun shield 22 is removably attached to the top portion of the windscreen, it can be removed quickly and stored when not needed. For storage purposes, rain-sun shield 22 is desirably equipped with a longitudinally extending hinge 40 of any conventional construction which permits folding the shield to a compact unit, as shown in FIG. 14, which can be conveniently stored in a minimum space on or about the motorcycle, for example, inside the storage compartment of the Vetter fairing previously cited.

In the embodiment shown in FIG. 2, the inside attaching leg 44 has an arcuate configuration. The arcuate portion permits the rain-sun shield 22 to pivot upwardly when an upward vertical force is applied to the shield. Thus, if a bump or rough terrain is being driven over and the driver of the motorcycle is suddenly bounced upwardly, the shield 22 will pivot and thus prevent head and/or neck injuries to the rider. Resilient or elastic hold-down cords 46, attached between opposite lateral edges of shield 22 and fairing 14, hold shield 22 snugly against the upper rim of the windscreen 16 and return the shield 22 to the normal, generally horizontal position after a vertical upward deflection.

In the event an extreme vertical upward deflection occurs, rain-sun shield 22 will allow continued unobstructed movement of the rider by automatically disengaging from the top of windscreen 16. The shield 22 will be held to the moving cycle by cords 46 to prevent loss or injury to persons or other vehicles. If the rain-sun shield 22 is struck with a brisk horizontally forward or downward blow, the rearward lip 44 (FIG. 2) will fail in order to prevent or reduce injury to the rider.

In the embodiment of the invention shown in FIGS. 1 and 4, the height of windscreen 16 is fixed at an elevation sufficient to provide clearance for the head of the driver when shield 22 is attached to the top thereof. Under good weather conditions, however, many riders prefer to look over the top of the windscreen, rather than through it, in order to avoid interference with their vision caused by reflections from the windscreen or the accumulation of dust or other foreign materials thereof. In order to provide added flexibility in the use of the invention for such drivers, there is shown in FIGS. 5, 6, 9 and 11 an alternative embodiment of the invention in which the height of the windscreen is adjustable by the rider as desired. As shown in the drawings, the embodiment comprises a conventional fairing 50 attached by any suitable means to the forward portion of motorcycle 51 as previously described. Attached to the forward face of fairing 50 is windscreen 52, which is adjustable in height from a lower position depicted by the solid line in FIG. 5 to an upper position shown by the dashed line. Windscreen 52 is attached to fairing 50 by means of a pair of hold-down plates 53 which bear against face shield 54 to clamp the lower extremity of windscreen 52 to the forward face of fairing 50 and/or mounting plate 57.

Figure 6:
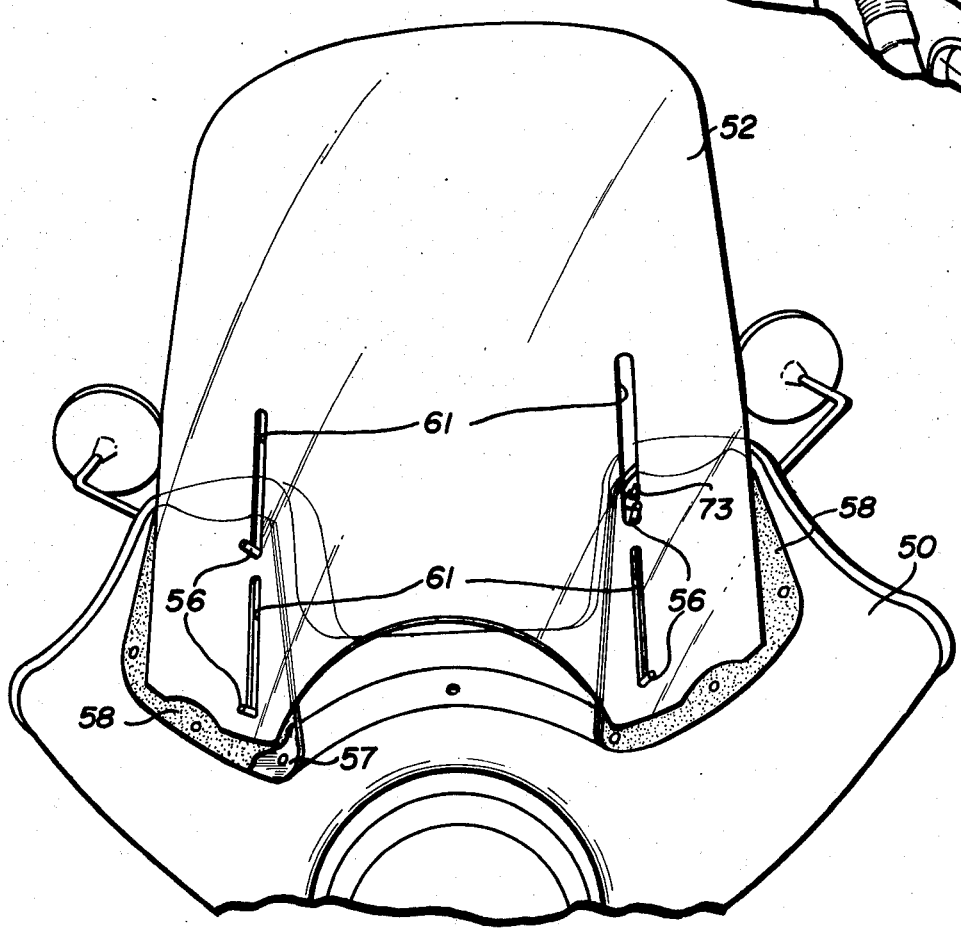
FIG. 6 is a front view of the ajustable windshield of the invention disclosed and claimed herein with the hold-down plates and face shield removed.

The construction and operation of the hold-down plates 53 are illustrated in FIG. 6, which shows windscreen 52 in position on fairing 50 after removal of hold-down plates 53 and face shield 54, and in FIG. 7 which shows the construction and operation of the hold-down system. As shown in these figures, fairing 50 is provided with a plurality of forward facing threaded studs 56, the inner ends of which are either directly attached to the forward face of fairing 50 or to an auxiliary mounting plate 57 as shown. Attached to the outer face of mounting plate 57 is a resilient mounting cushion 58. Each of studs 56 passes through an elongated slot 61 in windscreen 52 (see FIG. 6), and protrudes beyond the outer face of the windscreen. Hold-down nuts 62 engaging the outer threaded ends of studs 56 bear against hold-down plate 53 with sufficient force to clamp windscreen 52 in a desired vertically adjustable position.

In lieu of the arrangement shown in FIG. 6, vertical adjustability of the windscreen can also be provided, as shown in FIG. 9, by using a single slot 61 and several vertically spaced openings 65 in windscreen 52 through which a connection to fairing 50 and/or mounting plate 57 can be made.

A means for holding the windscreen of FIG. 9 in either an up or down location is shown in FIG. 10, which illustrates a retractable captive screw assembly 63 of a commercially available type which is permanently installed in hold-down plate 53 and face shield 54. For use with the retractable captive screw assembly, a mounting plate 66 attached to fairing 50 is provided with suitably threaded holes which engage the threaded screw 67 of the screw assembly. The retractive captive screw assembly is an alternate means of holding the windscreen of FIGS. 5, 6, and 7.

FIG. 7 also illustrates a windshield wiper assembly 70 which is desirably provided for cleaning the outer surface of windscreen 52. As shown, the assembly comprises an electric motor 71, the rear end of which is supported by a plastic housing 72. Drive shaft 73 protruding from metal housing 74, held in position by nut 76 engaging the threaded end of the housing, is functionally attached to wiper arm 77, in conventional fashion. To curtail theft of the windscreen and to prevent the wiper motor from turning, in sequence, nut 76 bears tightly on washer 85; washer 85 bears tightly on collar 84; and collar 84 bears tightly on resilient mounting cushion 58 and/or mounting plate 57. Collar 84 extends through the face shield 54 as shown or through both the face shield 54 and hold-down plates 53 (shown). When nut 76 is wrench-tight, washer 85 exerts little or no pressure on face shield 54 and windscreen 52 is free to move either up or down unless otherwise restrained by tightened hold-down nuts 62 on threaded studs 56. In order to permit windscreen 52 to be vertically adjustable without interfering with the operation of the wiper assembly, drive shaft 73 is located in one of vertical slots 61 which may be slightly enlarged for this purpose, as shown in FIG. 6. Wiper assembly 70 is also desirably provided with a spray head assembly 78 supplying a cleaning fluid to the outside surface of windscreen 52. The fluid is supplied through tube 79 in conventional fashion from a convenient source (not shown).

FIG. 8, which depicts the attachment of wiper arm 77 to drive shaft 73 of wiper motor 71, also illustrates a wiper arm stop means comprising a pair of upstanding rod arms 82, 83 formed preferably of a resilient material such as plastic and attached to hold-down plate 53. The arms are positioned so that the movement of the wiper arm during operation is resiliently brought to a stop at predetermined limits in order to prevent the wiper blade from running off the edge of the windscreen on the upstroke, to keep the wiper blade from noisily hitting the upper right cap screw 62, shown in FIG. 5 and to reduce lift-off of the wiper blade which occurs during high speed operation.

Figure 11:
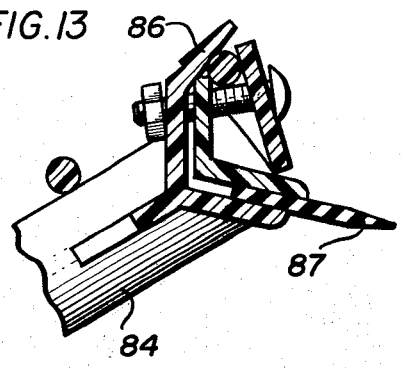
FIG. 11 is a perspective view of the sun-rain shield of the present invention installed on top of the windscreen and the wiper means for cleaning the rear face of the windscreen.
Figure 13:
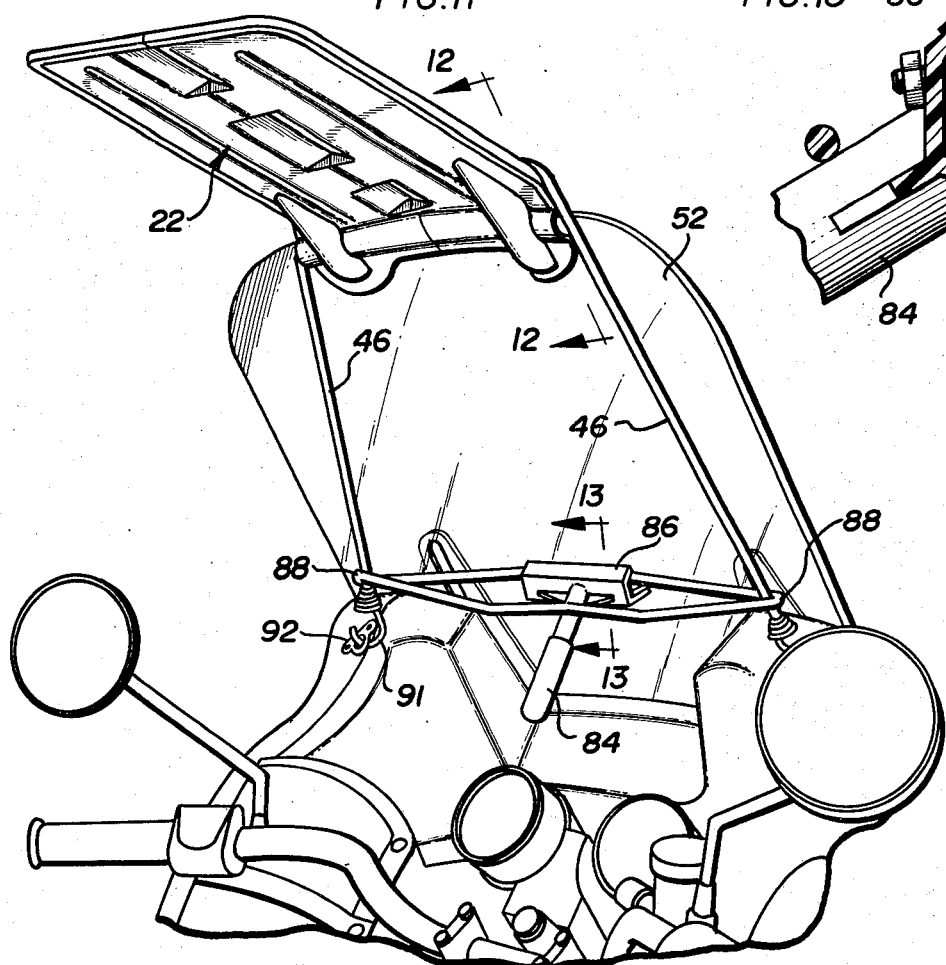
FIG. 13 is a partial section of the wiper means for the rear face of the windscreen taken along lines 13—13 in FIG. 11; and, FIG. 14 is a perspective view of the sun-rain shield of the present invention in a folded condition for storage.

Shown in FIGS. 11 and 13 is a manually operable wiper system for clearing the inner surface of windscreen 52 of accumulated water or other material. As shown, the wiper system comprises a handle 84 attached to a bracket 86 holding a conventional wiper blade which abuts the inner surface of the windscreen. Bracket 86 is provided at each of its extremities with a rigid looped elongated support 88 which frictionally engages elastic hold-down cords 46, used as previously described to urge sun-wind-rain shield 22 in a downward direction. One end of each cord 46 is attached permanently to a lateral edge of the shield, while the other end is fastened by means of a hook 91 to an appropriate bracket 92 on the motorcycle.

In operation, handle 84 is grasped by the rider and manipulated to bring blade 87 to bear against the inner surface of windscreen 52 and to clear the accumulated material. By reason of the elastic nature of cords 46 the wiper assembly can be moved horizontally as necessary to remove material from almost any portion of the windscreen. Vertical movement is permitted by rigid looped elongated supports 88 passing around the substantially vertical elastic hold-down cords 46.

Figure 12:
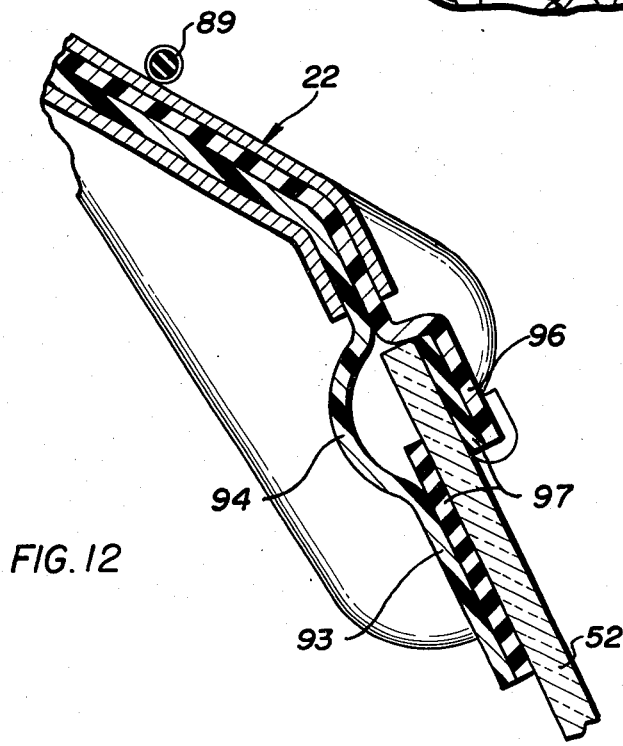
FIG. 12 is a partial section view of the rainshield joined to the windscreen taken along lines 12—12 of FIG. 11.

Depicted in FIG. 12 is an alternative embodiment of the resilient hook-on means formed at the forward edge of shield 22 for engaging the upper edge of windscreen 52. As shown, lip 93 is connected by an arcuate portion 94 to the main body of shield 22, while an opposite lip 96 creates an opening into which windscreen 52 fits. The inner face of each of lips 93 and 96 is provided with a resilient friction pad 97 which prevents scratching of the windscreen and holds shield 22 to maintain a position desired by the rider while permitting lateral adjustment from side to side of the windscreen as needed for maximum protection from the elements.

The foregoing detailed description has been given for clearness of understanding only, and no unnecessary limitations should be understood therefrom, as modifications will be obvious to those skilled in the art.

What is claimed is:

1. An enclosure for use with a motorcycle for protecting a rider thereof from wind, rain, sun, and the like, said enclosure comprising:
    a fairing adapted to be attached to the front portion of a motorcycle forward of the rider's position, said fairing having a generally convex, hollow, rearwardly opening configuration which partially encloses a rider of said motorcycle;
    a generally vertical, transparent windscreen, attached to and rising above the top edge of said fairing;
    first means for releasably attaching and for adjustably mounting said windscreen to said fairing to permit said windscreen to be moved vertically from a lower position wherein the upper edge of said windscreen is generally at or below the eye-level of said rider to an upper position wherein the upper edge of said windscreen is normally above the eye-level of said rider;
    a generally flat sun-rain shield including means for releasably attaching the shield to the upper edge of said windscreen, said shield extending rearwardly from said upper edge in a slightly upwardly inclined position; and
    second means for releasably attaching said shield to said windscreen, said means permitting upward deflection of said shield to prevent injury to said rider on contact therewith.

2. The enclosure of claim 1 wherein said first attaching means comprises at least two parallel vertical slots formed in said windscreen, and means passing through said slots and cooperating with said fairing for holding said windscreen, said elongated slots permitting adjustment of said windscreen over a vertical range from said lower to said upper position.

3. The enclosure of claim 2 which includes a windscreen wiper assembly adapted to wipe the forward surface of said windscreen, said wiper including an electric motor mounted on the inner side of said fairing;
    a drive shaft driven by said motor and projecting forwardly through said fairing and slot in the windscreen;
    a wiper arm operatively connected to said drive shaft;
    a wiper blade attached to said arm and bearing against the forward surface of said windscreen;
    said drive shaft projecting through one of said vertical slots in said windscreen, whereby the vertical position of said windscreen can be adjusted without interfering with the operation of said wiper assembly.

4. The enclosure of claim 2 including means for limiting the angular movement of said wiper arm to keep the wiper blade from running off the windscreen, to prevent lift-off and to overcome noisy wiper operation, comprising a bracket attached to said fairing and provided with an opening through which said drive shaft passes, said bracket being provided with a pair of spaced resilient upstanding stops arranged on opposite sides of said wiper arm, said stops being positioned to resiliently intercept and prevent excessive angular movement of said wiper arm.

5. The enclosure of claim 3 which includes a washer spray head assembly for supplying a cleaning solution to said windscreen, said spray head assembly being positioned in one of said slots in said windscreen.

6. The enclosure of claim 2 in which said sun-rain shield includes a resilient hook-on means adapted to hold said shield to the top of said windscreen, said hook-on means including two spaced generally resilient lip portions defining an opening therebetween for receiving and gripping the top edge of said windscreen, at least one of said lip portions including clearance means permitting said shield to flex on the application of an upward force.

7. The enclosure of claim 6 including resilient hold-down means for urging said shield in a downward direction.

8. The enclosure of claim 6 in which said hold-down means comprises a pair of spaced resilient extensible cords, each of which has one end attached to said shield and the other end attached to said fairing.

9. The enclosure of claim 8 in which said cords are attached to opposite lateral edges of said shield and lie in a substantially parallel position adjacent the inner surface of said windscreen, said enclosure further including a wiper assembly for cleaning the inner surface of said windscreen, said wiper assembly comprising a handle portion, a wiper blade attached to said handle portion and adapted to bear against said inner surface, an elongated loop support attached to each end of said handle portion and extending outwardly therefrom, each of said loop supports engaging one of said cords, said handle assembly being manually movable vertically and horizontally by said rider to position said blade for removal of material accumulated on said inner surface.

10. The enclosure of claim 8 including means for preventing water droplets from reaching the high vacuum inner surface of the windscreen, said means comprising large convention air intakes, deflectors and diffusers mounted in either the fairing or windscreen for the purpose of blowing the swirling water droplets away from the windscreen rear face.

11. The enclosure of claim 1 and further including hold down means located adjacent the front face of said windscreen to extend below the lower edge of said windscreen for assisting in maintaining the windscreen in position relative to the fairing and to preclude water from entering under the lower windscreen edge to the operator area, particularly when the windscreen is in an elevated position.

12. The enclosure of claim 1 and further including shield means located adjacent the front face of said windscreen to extend below the lower edge of said windscreen for precluding water from entering under the lower windscreen edge to the operator area, particularly when the windscreen is in an elevated position.

13. A removable shield for use with a windscreen having an upper edge to protect a rider from the weather such as rain or sun; said shield including:
    a first portion;
    a mounting portion extending from said first portion;
    said mounting portion including means for releasably securing said shield to the windscreen and for permitting said shield to be moved laterally along the upper edge of the windscreen to afford a rider protection from adverse weather conditions.

14. A shield in accordance with claim 13 wherein said shield includes hold down means;
    biasing means for maintaining said shield in position relative to a windscreen; and,
    said hold down means including biasing means for connecting said shield to the vehicle to which a windscreen and said shield are attached.

15. A rain shield in accordance with claim 14 wherein said mounting portion includes inner and outer legs extending from the free end thereof;
    said inner and outer portions being spaced from each other and being sufficiently flexible to be snapped into position contiguous to the upper edge of a windscreen.

16. A shield in accordance with claim 15 wherein said inner leg is arcuately shaped for permitting said shield to pivot about a windscreen.

17. A shield in accordance with claim 13 wherein said first portion and mounting portions are hinged to permit said shield to be collapsed.

18. A shield in accordance with claim 17 wherein said hinge extends longitudinally of said first portion and mounting portion.

19. A windscreen assembly adapted for use with a motorcycle fairing, the windscreen being adjustable relative to the fairing, said windscreen comprising:
    a generally vertical, transparent member which is adapted to be attached to the fairing; and,
    means for releasably fastening and adjustably positioning the windscreen to the fairing whereby said screen is adapted to be adjusted vertically relative to the fairing so that the top edge of said screen is adjusted relative to the eye level of a motorcycle rider.

20. An adjustable windscreen assembly in accordance with claim 19 wherein said windscreen has at least one elongated slot located contiguous to the lower edge of the windscreen; and,
    said fastening means being adapted to be positioned in said slot and cooperate with the fairing whereby said windscreen can be adjusted relative to the fastening means along the length of said slot.

21. An adjustable windscreen assembly in accordance with claim 20 wherein said windscreen includes a pair of spaced substantially parallel slots and a fastening means associated with each slot for adjustably and releasably attaching said screen to the fairing.

22. An adjustable windscreen assembly in accordance with claim 21 and further including a hold down plate adapted to be positioned over each of said slots and retained in said position by said fastening means.

23. A windscreen assembly in accordance with claim 19 wherein said windscreen adjustment means includes a plurality of spaced apertures located in said windscreen.

24. A windscreen assembly in accordance with claim 19 and further including an elongated opening in said windscreen for receipt of at least a portion of a windshield-wiper assembly.

25. A windscreen assembly in accordance with claim 19 and further including hold down means adapted to be located adjacent the front face of said windscreen to extend below the lower edge of said windscreen for assisting in positioning the lower portion of said windscreen relative to said fairing and to preclude water from entering under the lower windscreen edge to the operator area, particularly when the windscreen is in its elevated position.

26. A windscreen assembly in accordance with claim 19 and further including shield means adapted to be located adjacent the front face of said windscreen to extend below the lower edge of said windscreen for precluding water from entering under the lower windscreen edge to the operator area, particularly when the windscreen is in its elevated position.

* * * * *

UNITED STATES PATENT OFFICE
CERTIFICATE OF CORRECTION

Patent No. 4,066,291                     Dated January 3, 1978

Inventor(s) John S. Hickman

It is certified that error appears in the above-identified patent and that said Letters Patent are hereby corrected as shown below:

Column 3, line 20, change "alone" to --along--;
Column 4, line 22, change "clearing" to --cleaning--;
Column 8, line 48, following "generally" insert --parallel--.

Signed and Sealed this

Second Day of May 1978

[SEAL]

Attest:

RUTH C. MASON
Attesting Officer

LUTRELLE F. PARKER
Acting Commissioner of Patents and Trademarks